United States Patent [19]

Pahl

[11] Patent Number: 5,471,833
[45] Date of Patent: Dec. 5, 1995

[54] ROCKET PROPELLANT PRESSURIZATION SYSTEM USING HIGH VAPOR PRESSURE LIQUIDS

[75] Inventor: Donald A. Pahl, Woodinville, Wash.

[73] Assignee: Olin Corporation, Redmond, Wash.

[21] Appl. No.: 132,734

[22] Filed: Oct. 6, 1993

[51] Int. Cl.⁶ ..................................................... F02K 9/50
[52] U.S. Cl. ............................................. 60/259; 60/39.48
[58] Field of Search .......................... 60/257, 259, 39.48, 60/734, 240

[56] References Cited

U.S. PATENT DOCUMENTS

| | | |
|---|---|---|
| 2,732,657 | 1/1956 | Krautkramer . |
| 3,009,316 | 11/1961 | McKinley . |
| 3,049,832 | 8/1962 | Joffe . |
| 3,132,977 | 5/1964 | Knight . |
| 3,140,582 | 7/1964 | Tyson, Jr. . |
| 3,257,799 | 6/1966 | Goalwin . |
| 3,336,750 | 8/1967 | Beckman . |
| 3,427,806 | 2/1969 | Truax et al. ............................... 60/259 |
| 3,427,808 | 2/1969 | Butcher ..................................... 60/259 |
| 3,517,508 | 6/1970 | Newman et al. . |
| 3,545,068 | 12/1970 | Bowles . |
| 3,672,165 | 6/1972 | Baum . |
| 3,945,203 | 3/1976 | Kayser ....................................... 60/259 |
| 4,279,269 | 7/1981 | Schink et al. . |
| 4,867,196 | 9/1989 | Blewett et al. . |
| 4,901,525 | 2/1990 | Beveridge et al. . |
| 4,926,632 | 5/1990 | Smith et al. . |
| 4,946,522 | 8/1990 | Liedtke et al. . |

OTHER PUBLICATIONS

Barrere et. *Rocket Propulsion* Elsevier Publishing Co. London, 1960. p. 641.

Primary Examiner—Louis J. Casaregola
Attorney, Agent, or Firm—Gregory S. Rosenblatt

[57] ABSTRACT

There is provided a system for expelling a liquid fuel component from a tank to a rocket engine utilizing a pressurized gas to displace the propellant. A pressurized high vapor pressure liquid is combined with the pressurized gas reducing the volume of pressurizing agent required to expel a desired volume of the liquid fuel component. Since the volume of pressurizing gas is less, the weight of the propelled craft may be reduced or additional fuel carried. In another embodiment of the invention, the vapor phase of the high vapor pressure liquid is used as a reference pressure to control other systems.

14 Claims, 9 Drawing Sheets

5,471,833

ROCKET PROPELLANT PRESSURIZATION SYSTEM USING HIGH VAPOR PRESSURE LIQUIDS

BACKGROUND OF THE INVENTION

This invention relates to pressurization systems for space craft and missiles. More particularly, a compressed high vapor pressure liquid pressurizes a propellant feed system or functions as a reference pressure for a control device.

The propellant expulsion system of a liquid fuel engine constitutes a significant portion of the weight and cost of that engine. The propellant expulsion system includes a storage chamber for the propellant, a mechanism for feeding the propellant to a combustion chamber and a means to introduce the propellant into the chamber. The liquid propellant is stored in containers and fed to the combustion chamber either by a pressurized gas or by a displacement piston or centrifugal pump.

U.S. Pat. Nos. 3,009,361 to McKinley and 3,672,165 to Baum, disclose the use of a pressurized inert gas, typically helium, to expel a liquid propellant to a combustion chamber. A large volume of highly pressurized gas is required to expel an effective volume of propellant. The pressurized gas is stored in thick walled metallic containers until required. These containers occupy a significant portion of the available space within the rocket and contribute a significant weight penalty.

Another method for feeding liquid propellant to a combustion chamber is disclosed in U.S. Pat. No. 4,901,525 to Beveridge et al. The patent discloses delivering pressurized liquid propellant to a turbo pump. The propellant is then combined with a small amount of liquid oxidant and ignited to drive the turbo pump. The turbo pump then delivers a propellant rich liquid to the combustion chamber at high pressure. This method avoids the necessity of thick walled tanks to store a pressurized expulsion gas, but the large number of turbo pumps increases the cost and complexity of the delivery system.

There exists, therefore, a need for a liquid propellant delivery system which does not suffer from the weight, space and complexity problems of the prior art systems.

SUMMARY OF THE INVENTION

Accordingly, it is an object of the invention to provide a propellant expulsion system for delivering liquid propellant to a rocket engine which reduces the amount of space and weight required to store the propellant expulsion means. It is feature of the invention that at least a portion of the propellant expulsion means is a high vapor pressure liquid. Yet another feature of the invention is that the high vapor pressure liquid provides a constant pressure reference source which is useful to control the rate of propellant and oxidizer flow to the engine.

It is an advantage of the invention that the volume of compressed high vapor pressure liquid which expels a desired volume of liquid propellant is significantly less than the volume of a compressed gas required to expel a similar volume of propellant. As the result, the propellant expulsion means occupies a smaller volume, reducing the weight of the delivery system or increasing the amount of propellant which may be carried. Yet another advantage of the invention is that the compressed high vapor pressure liquid has a constant pressure at a given temperature and is used as a reference to control the feed of propellant and oxidizer to the engine. This reduces the number of electronic sensors and controllers required to operate the engine, reducing the cost and complexity of the engine and reducing the likelihood of failure.

In accordance with the invention, there is provided a system for delivering a liquid fuel component to a rocket engine. The system has an expulsion tank containing a pressurized liquid and a pressurized fluid. A liquid fuel component tank contains a liquid fuel component. A first conduit controllably delivers the pressurized fluid to the liquid fuel component tank displacing at least a portion of the liquid fuel component. A second conduit delivers the displaced liquid fuel component to the combustion chamber of the rocket engine.

The above stated objects, features and advantages will become more apparent from the specification and drawings which follow.

IN THE DRAWINGS

Figure 4:
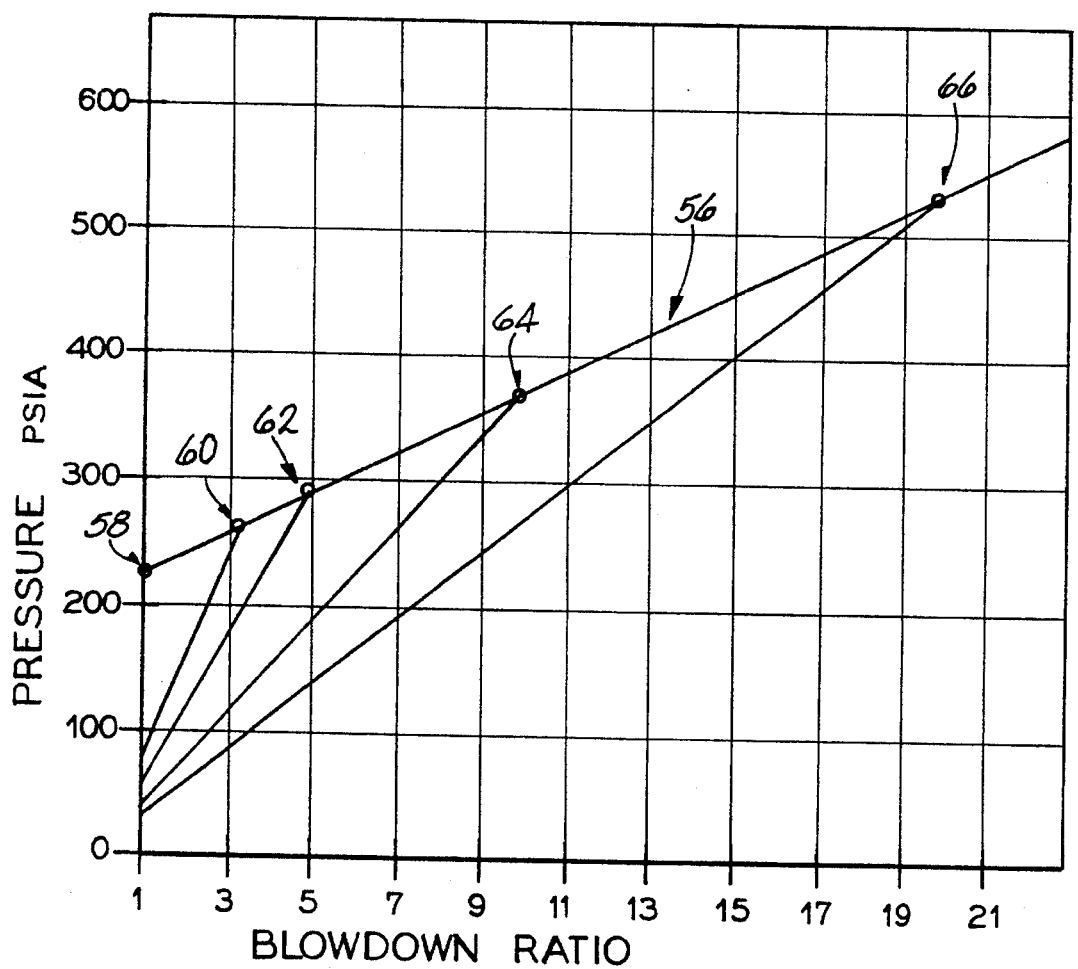

FIG. 4 graphically illustrates the decreased pressure ratio achieved for a given blow down ratio using the expulsion system of the invention.

Figure 5:
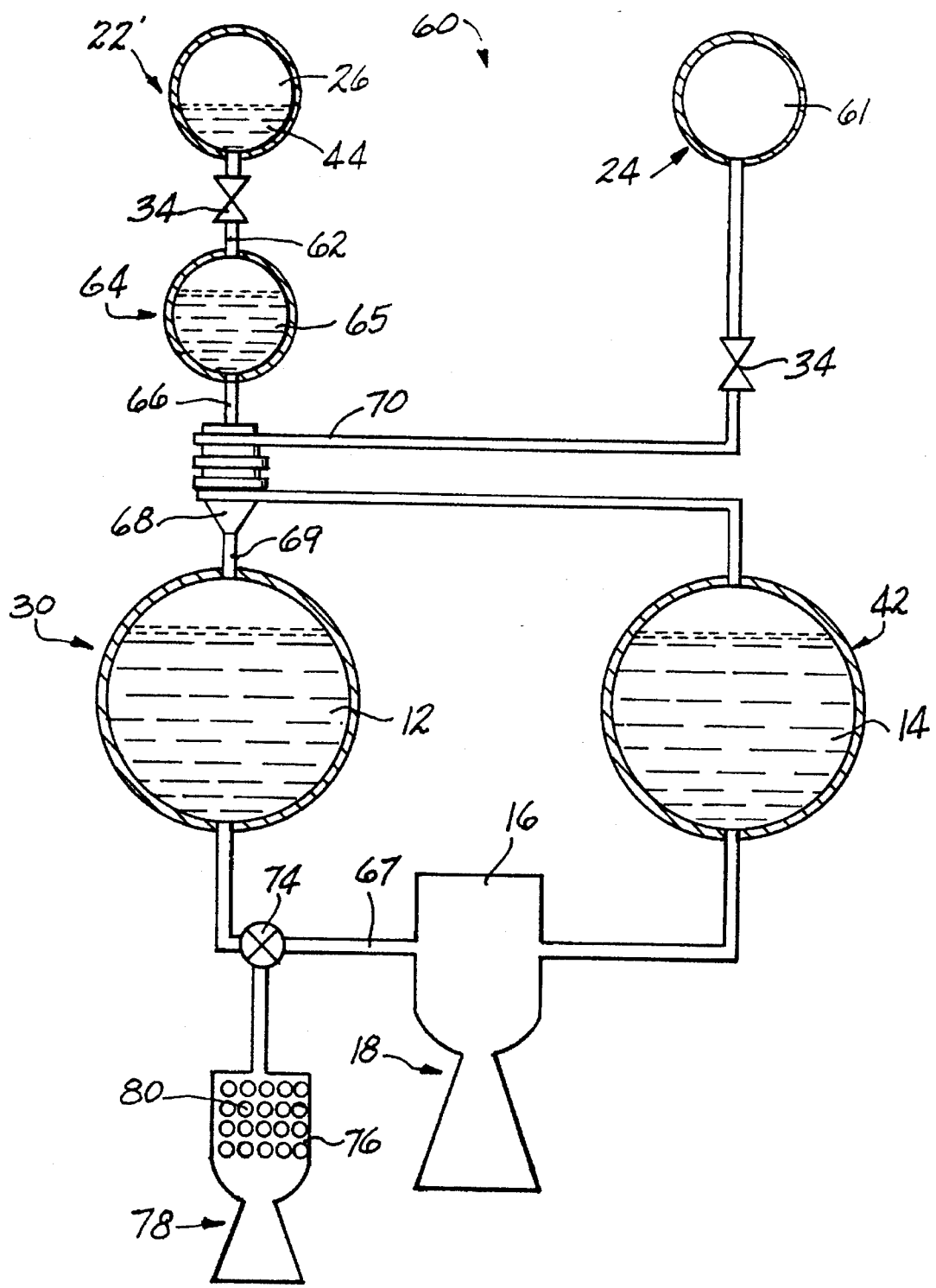

FIG. 5 shows in block diagram a two stage liquid fuel component expulsion system in-accordance with an embodiment of the invention.

Figure 6:
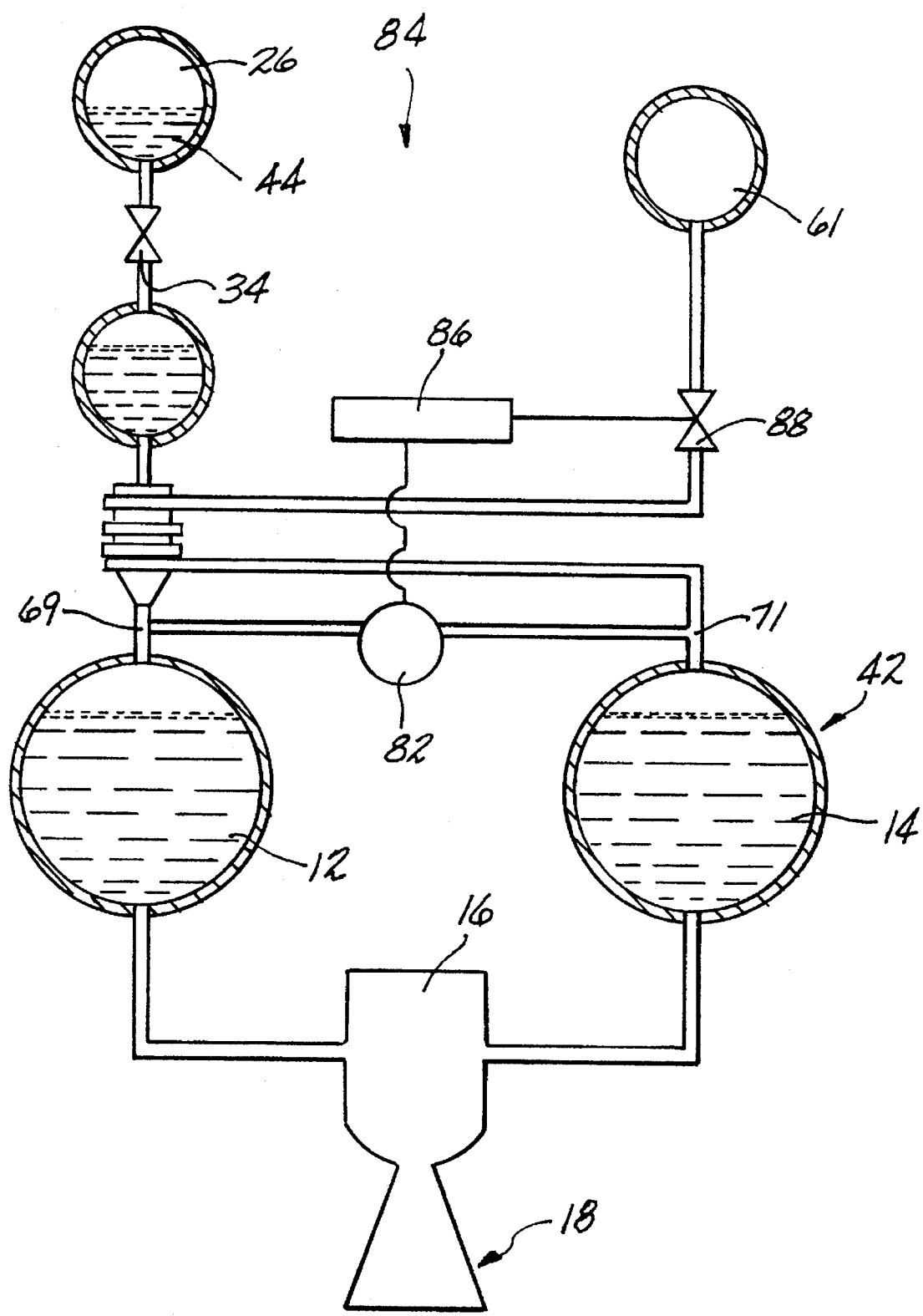

FIG. 6 shows in block diagram a liquid fuel component expulsion system in which the oxidizer flow rate is a function of the pressure under which the liquid propellant is delivered to a combustion chamber in accordance with the present invention.

Figure 7:
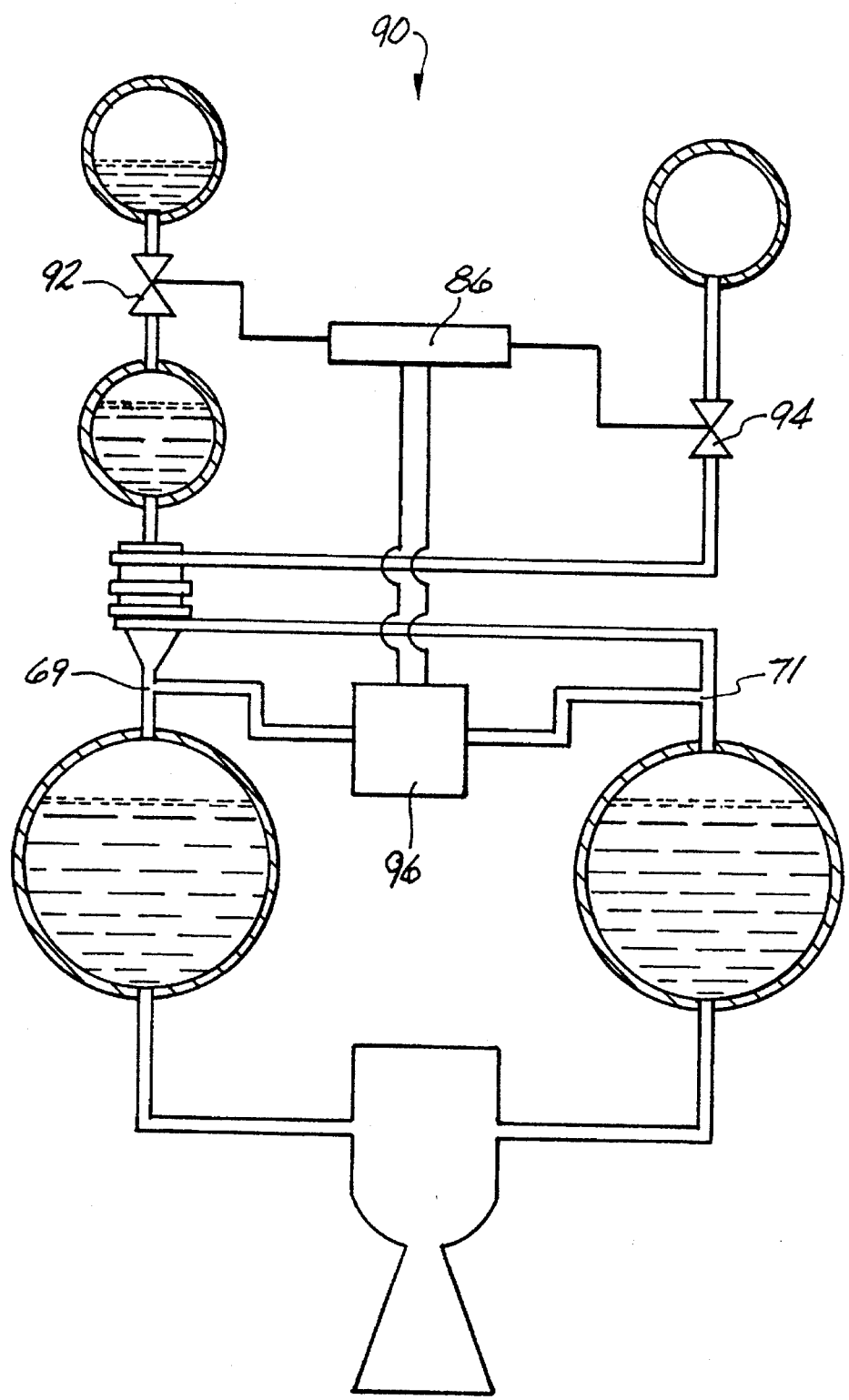

FIG. 7 shows in block diagram a liquid fuel component expulsion system in which the liquid propellant and liquid oxidizer flow rates are independently controlled using a high vapor pressure liquid as a reference.

Figure 8:
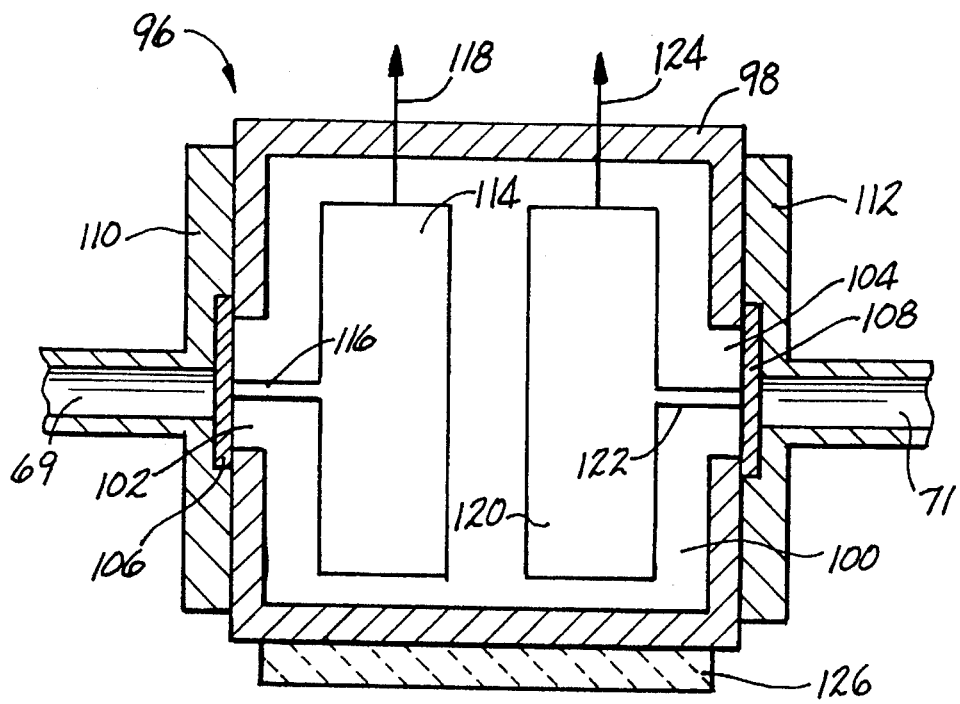

FIG. 8 shows in cross-sectional representation the control mechanism of FIG. 7.

Figure 9:
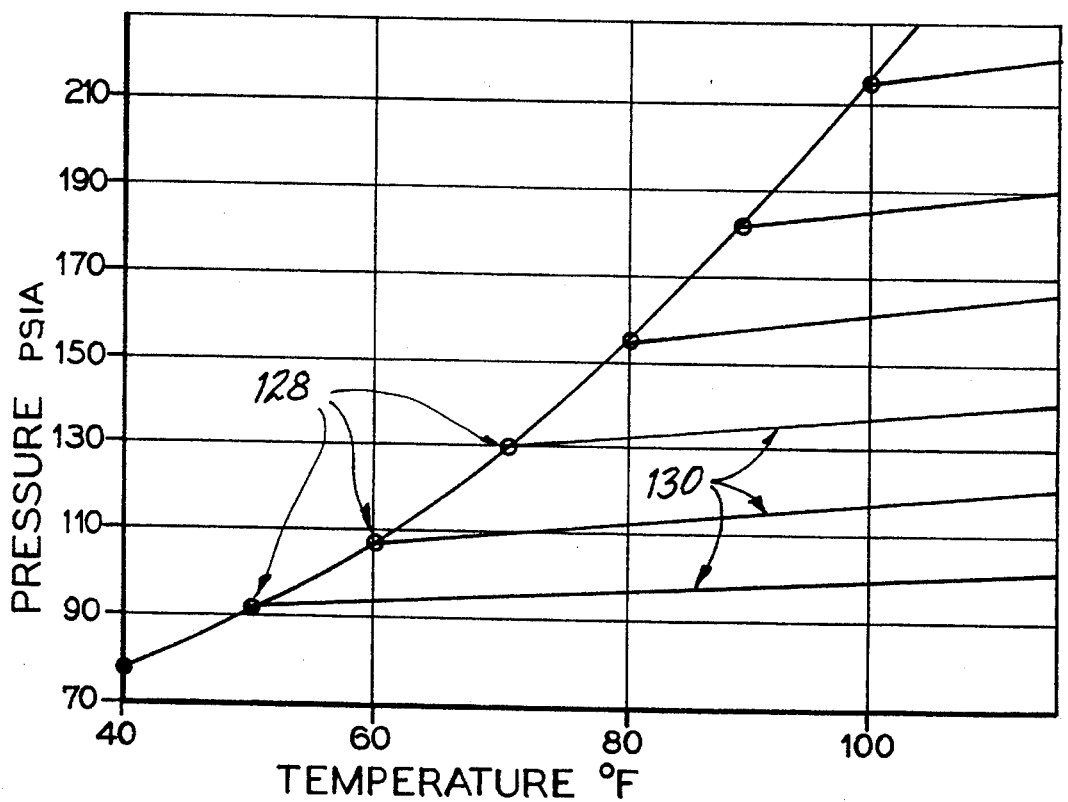

FIG. 9 graphically illustrates the pressure of ammonia vapor in a closed reference chamber as a function of temperature.

Figure 10:
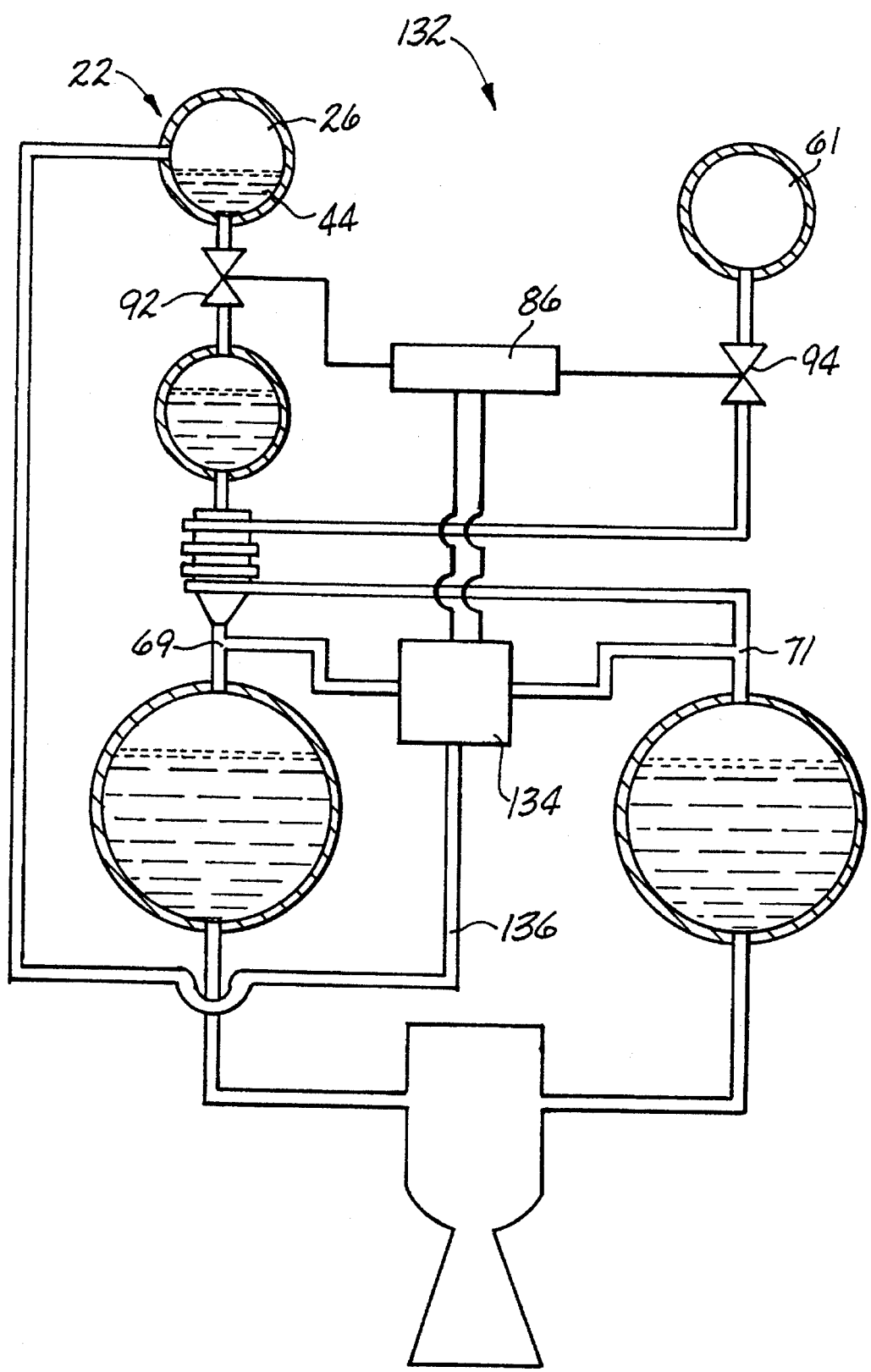

FIG. 10 shows in block diagram a liquid fuel component expulsion system in which the liquid propellant and liquid oxidizer flow rates are independently controlled by a control system utilizing as a reference the constant pressure of the liquid propellant expulsion tank.

Figure 11:
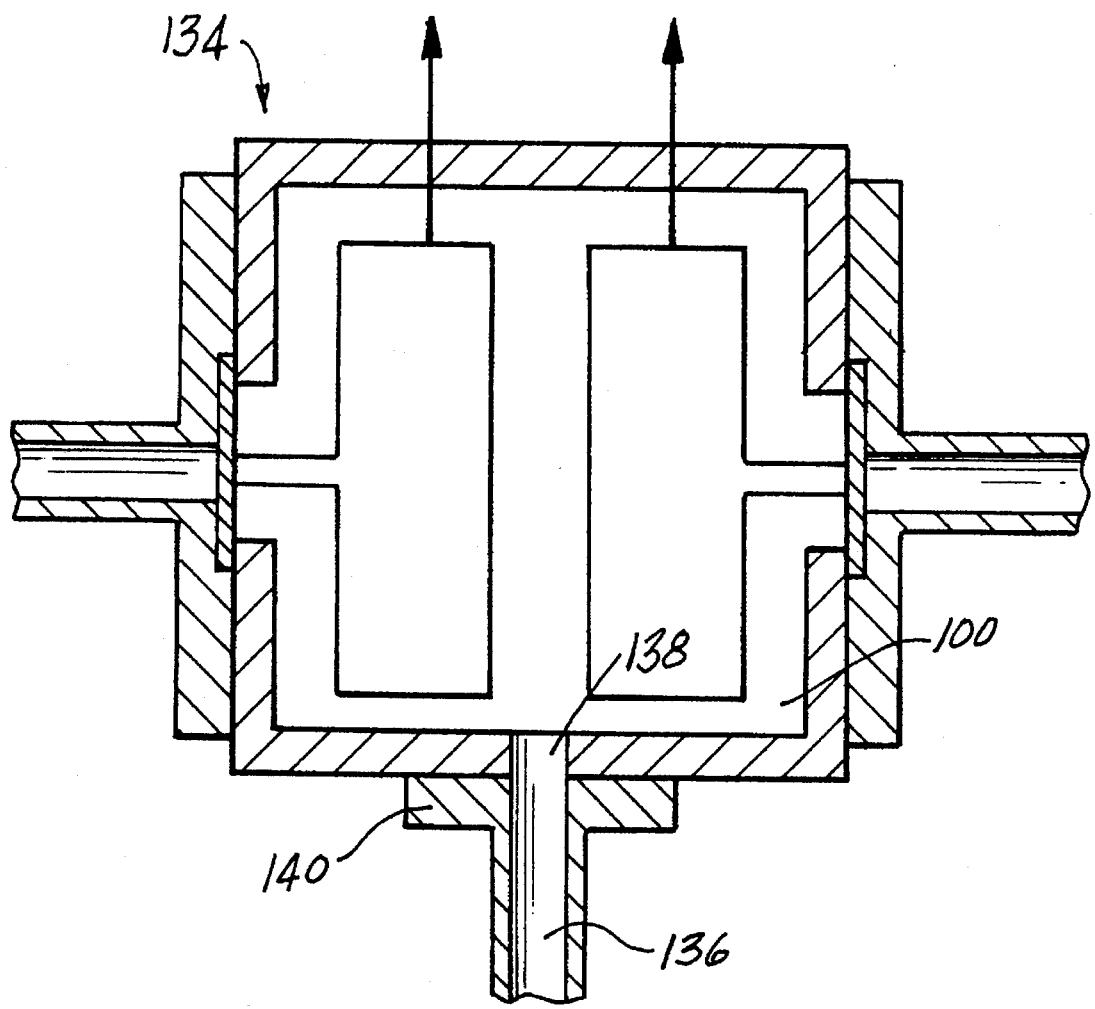

FIG. 11 shows in cross-sectional representation the control mechanism of FIG. 10.

DETAILED DESCRIPTION

Figure 1:
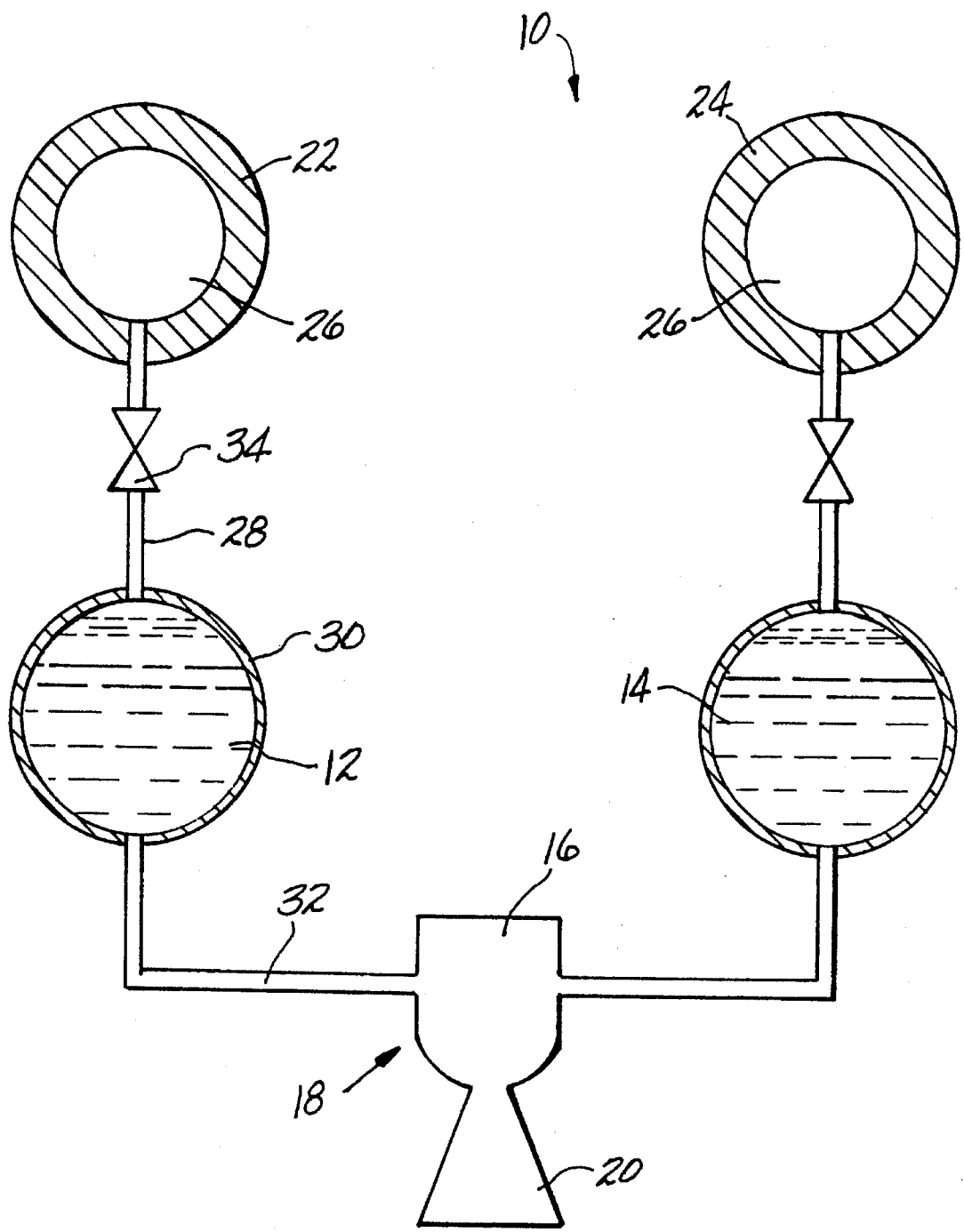
FIG. 1 shows in cross-sectional representation a system for delivering a liquid fuel component to a rocket engine in accordance with the prior art.

FIG. 1 shows in cross-sectional representation a liquid fuel component expulsion system 10 as known from the prior art. The fuel expulsion system 10 is a bi-propellant type having separate liquid propellant 12 and liquid oxidizer 14 sources. The fuel is a mixture of the fuel components. Among the fuel components of a bi-propellant system are the propellant and the oxidizer. The fuel of a mono-propellant system is generally limited to the mono-propellant.

Typically, the liquid propellant 12 is hydrazine ($N_2H_4$), kerosine, or another rocket fuel known in the art. One suitable liquid oxidizer 14 is nitrogen tetroxide ($N_2O_4$). When the liquid propellant 12 and liquid oxidizer 14 are combined in the combustion chamber 16 of a rocket engine 18, the liquid propellant is rapidly combusted to reaction exhaust gases which are expelled through nozzle 20 propelling the space ship or missile.

The efficient operation of the rocket engine 18 requires that the combustion chamber 16 be provided with a constant supply of liquid propellant 12 and liquid oxidizer 14 provided in a precise mixture ratio. To exhaust the liquid propellant 12 and liquid oxidizer 14, first 22 and second 24 expulsion tanks are provided. The first 22 and second 24 expulsion tanks are filled with a pressurized gas 26, typically helium or nitrogen. A first conduit 28, typically a stainless steel pipe, delivers the pressurized gas 26 to the liquid propellant tank 30, displacing the liquid propellant 12 at a desired rate. A second conduit 32 delivers the liquid propellant 12 to the combustion chamber 16. A valve 34 which may be mechanically, electrically or pyrotechnically activated, controls the timing and rate of displacement of the liquid propellant 12 by the pressurized gas 26.

In a mono-propellant system, as known from the prior art but not illustrated, the liquid oxidizer tank is absent and the liquid fuel is decomposed to reaction exhaust gases by a catalyst or heat. A conventional mono-propellant expulsion system 10 has a blow down ratio of about 4:1, the volume of pressurized gas 26 required to expel a desire volume of liquid fuel 12 is four times the volume of that liquid fuel when the gas and liquid are at uniform pressure. As a result, the pressurized gas 26 must be highly pressurized, typically on the order of 400 psia, necessitating thick walled metal expulsion tanks. These heavy metal tanks take up a significant amount of space and contribute a significant weight penalty, typically on the order of 10–20 pounds.

Figure 2:
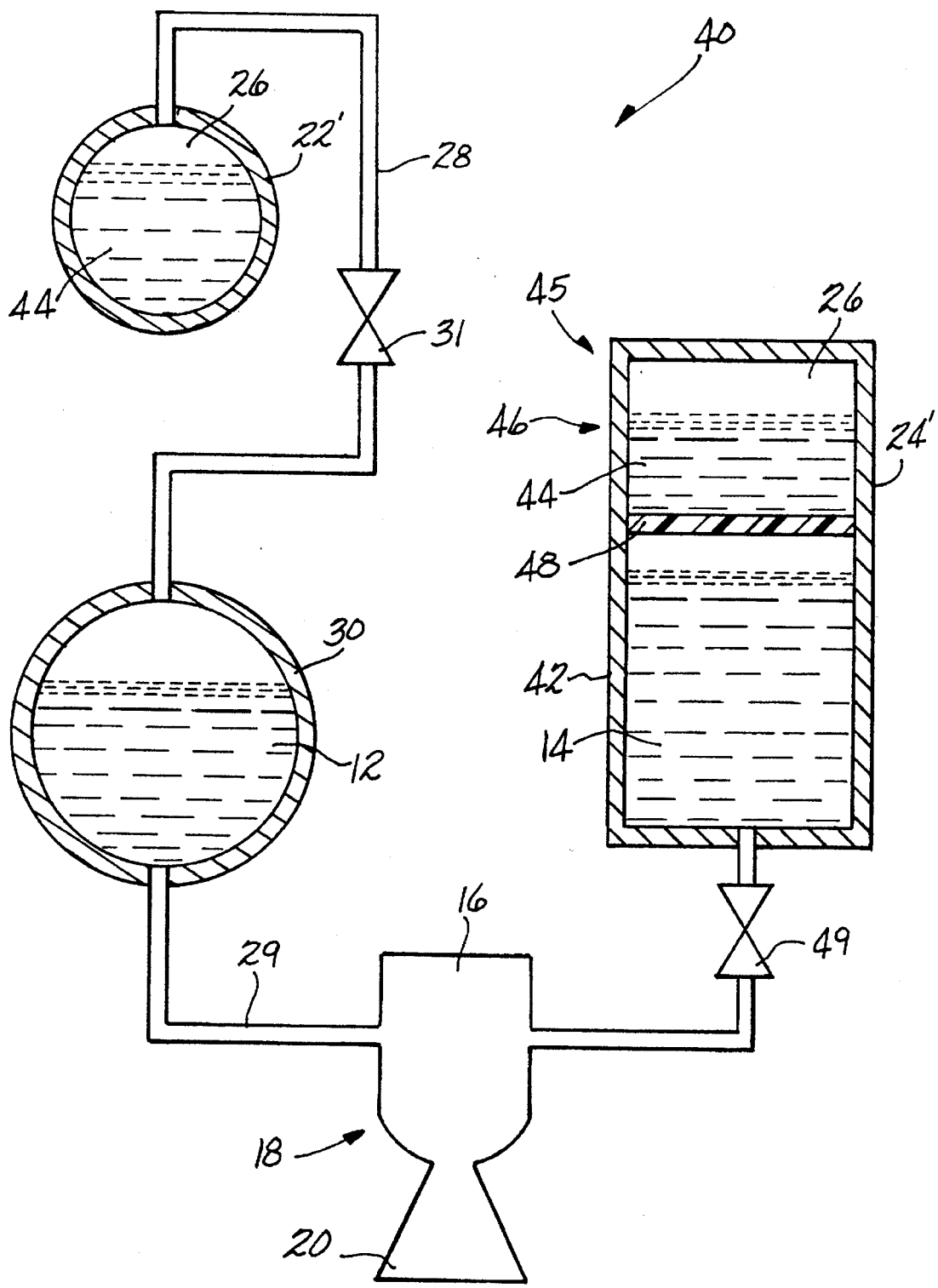
FIG. 2 shows in cross-sectional representation a system for delivering a liquid fuel component to a rocket engine in accordance with an embodiment of the invention.

Applicant's inventive system for delivering a liquid fuel component to a rocket engine, as illustrated in cross-sectional representation in FIG. 2, reduces the volume of pressurized gas required, which either reduces the overall weight of the propellant expulsion system or increases the amount of liquid fuel which can be carried on board. Both options increase the effective range of the space ship or missile.

With reference to FIG. 2, the propellant expulsion system 40 contains some elements similar to those of the prior art and these elements are indicated by like reference numerals. Different elements which perform similar functions to the prior art elements are indicated by primed reference numerals.

While FIG. 2 illustrates the use of a bi-propellant expulsion system, the concepts of the invention are equally applicable to mono-propellant expulsion systems.

The propellant supply system 40 includes a liquid propellant 12 contained in a liquid propellant tank 30. Preferably, the liquid propellant is hydrazine. A liquid oxidizer 14, typically nitrogen tetroxide, is contained in a liquid oxidizer fuel tank 42. The expulsion systems and reference systems of the invention are equally applicable to the "propellant side" and the "oxidizer side" of any such system. The liquid propellant 12 and liquid oxidizer 14 are combined in the combustion chamber 16 of a rocket engine 18 and the reaction product gases exhausted through nozzle 20 to drive the space ship or missile.

The liquid propellant 12 and liquid oxidizer 14 are expelled from the liquid propellant tank 30 and liquid oxidizer tank 42, respectively, by displacement by a pressurized fluid provided from the first 22' and second 24' expulsion tanks. Typically, valve 31 which can be mechanical, electromechanical or pyrotechnic and normally closed determines the ignition timing. An electromechanical, normally closed, valve is preferred. The first 22' and second 24' expulsion tanks contain a pressurized liquid component 44 and, optionally, a pressurized gas component 26. The pressurized liquid component 44 is any suitable high vapor pressure liquid having a vapor pressure at ambient temperature (70° F.) of from about 100 to about 1500 psia. The preferred vapor pressure is from about 130 psia to about 500 psia at ambient. Suitable materials include fluorinated hydrocarbons, ammonia and mixtures thereof. Ammonia is preferred because expulsion of ammonia is less detrimental to the ozone layer and ammonia is highly compatible with the preferred liquid propellant 12, hydrazine. When the preferred fluid is also a liquid, the second liquid can be the same or different than the first liquid.

The gaseous component 26 is any suitable inert gas such as helium, nitrogen or mixtures thereof. The relatively higher density of the pressurized high vapor pressure liquid as compared to the pressurized gas reduces the volume of pressurized fluid required to expel the desired volume of liquid propellant 12. Smaller propellant expulsion tanks 22' and 24' may be utilized, having thinner walls, thereby reducing the space constraints and weight penalty of the propellant supply system. AS a result, more liquid fuel 12 and liquid oxidizer 14 may be included in the propellant expulsion system 40, increasing the usefulness of the rocket engine 18.

Either, or both, compressed fluids (liquid or gaseous component) may be transmitted through a first conduit 28 to displace a portion of the liquid propellant 12 into a second conduit 29 for delivery to the combustion chamber 16. The gaseous component, if present, is preferred because it has a lower density. Rather than separate tanks 22', 30 to contain the expulsion means and the liquid fuel component as illustrated on the propellant side of FIG. 2, a single tank 45 may be utilized as illustrated on the oxidizer side of FIG. 2. In the single tank configuration, the first conduit could be a portion of the interior wall of the tank 45.

Either the multiple tank or the single tank expulsion means is suitable for either fuel component of a bi-propellant system and for a monopropellant system.

The single tank system has an expulsion portion 46 containing a pressurized high vapor pressure liquid component 44 and, optionally, a pressurized gas component 26. The expulsion portion 46 is separated from the fuel component by a metal or elastomeric piston 48. The piston is any suitably rigid material which does not react with the propellant and expulsion components. For a hydrazine/nitrogen tetroxide system, a preferred material for the piston 48 is stainless steel. When the valve 49, which may be mechanical, electromechanical or pyrotechnic, is opened, the evaporation and expansion of the high vapor pressure liquid component 44 drives the piston to displace the liquid fuel component to the combustion chamber 16.

Figures 3A, 3B, 3C:
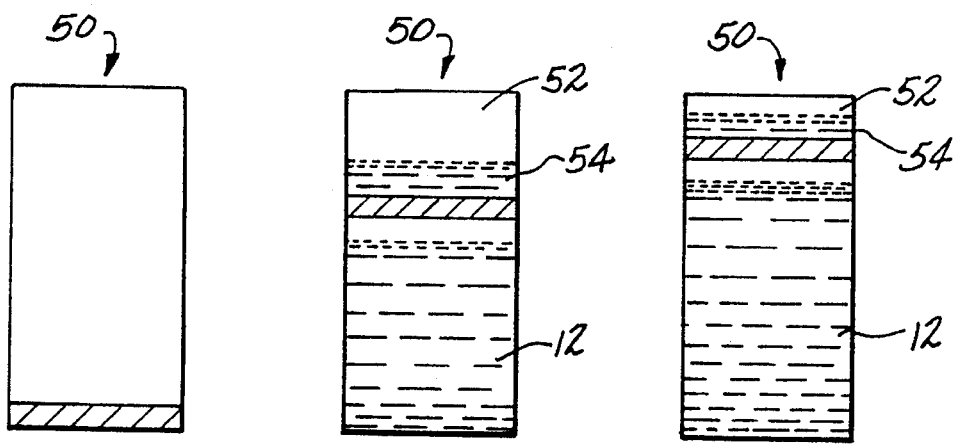
FIG. 3A–3C shows in block diagram how the use of a compressed liquid increases the amount of liquid fuel component expelled by the delivery system of the invention.

FIGS. 3 and 4 graphically illustrate the benefits of the present invention. In FIG. 3, the effect of a high vapor pressure liquid on the pressure blow down is illustrated. In FIG. 3A, the propellant tank 50 is filled with ammonia vapor to a pressure of 247 psia, at 110° F. the equilibrium point. To this tank, 20 psi of gaseous helium is added for a total pressure of 267 psia. FIG. 3A illustrates a condition before the addition of any liquid fuel, ullage is 100 percent.

When the propellant tank 50 is two thirds filled (ullage= 33.3%) with a liquid fuel 12 as illustrated in FIG. 3B, the pressurized side 52 contains ammonia vapor at the equilibrium pressure at 247 psia and gaseous helium at 60 psia for a total pressure of 307 psia. Since the pressure is greater than the equilibrium pressure of ammonia vapor, pressurized liquid ammonia 54 condenses.

As additional liquid fuel 12 is added so the tank 50 is 5/6 full as illustrated in FIG. 3C (ullage=16.7%), the pressure of the gaseous ammonia remains at the equilibrium point, 247 psia, and the pressure of the gaseous helium increases to 120 psi for a total pressure of 367 psia. The volume of pressurized liquid ammonia 54 also increases. When the liquid fuel 12 is expelled from the propellant tank 50 of FIG. 3C, the 6/1 volume blow down to empty the tank yields a pressure blow down of 367 psia/267 psia or 1.37. This compares quite favorably to a system containing gaseous helium as the only pressurizing agent. In the gas only system, a 6/1 volume blow down requires a 6/1 pressure blow down at constant temperature.

FIG. 4 graphically illustrates the advantage of the propellant expulsion system of the present invention for systems having various blow down ratios at constant temperature. Reference line 56 represents the total pressure in an ammonia augmented blow down system. At 100° F., the equilibrium vapor pressure of ammonia is approximately 232 psia as indicated by reference point 58. At a blow down ratio of approximately 3.2:1, (reference point 60) the total pressure is about 265 psia. The pressure blow down ratio is 265 psia/232 psia=1.14:1. This compares quite favorably to the 3.2:1 pressure blow down ratio of isothermal gaseous helium, as shown by the curve sloping steeply downward from reference point 60.

Table 1 illustrates the pressure blow down improvement for the blow down ratios (reference numerals 60,62,64,66) illustrated in FIG. 4. In each case, the isothermal helium pressure blow down ratio would be equal to the volume blow down ratio.

TABLE 1

| Reference Numeral | Blow down Ratio | Total Pressure (psia) | Pressure Ratio |
| --- | --- | --- | --- |
| 60 | 3.2 | 265 | 1.14 |
| 62 | 5 | 290 | 1.25 |
| 64 | 10 | 360 | 1.55 |
| 66 | 20 | 525 | 2.26 |

Improved propellant supply systems are achieved using a hybrid (pressurized liquid/pressurized gas) expulsion system. FIG. 5 shows in block diagram, a propellant supply system 60 in accordance with an embodiment of the invention. The first 22' expulsion tank contains a mixture of a pressurized high vapor pressure liquid 44 and a pressurized fluid 26. Preferably, the pressurized fluid is a first pressurized gas 26. A second 24 expulsion tank contains a second pressurized gas 61.

When valves 34, typically electromechanical and normally closed, are opened, the first expulsion tank 22' communicates its pressure through a first conduit 62 to a primer tank 64. The primer tank contains a quantity of a decomposable liquid 65. The decomposable liquid is preferably in substantial part the same liquid as the propellant fuel component 12, such as hydrazine. The decomposable liquid is delivered through a second conduit 66 to a gas generator 68.

The gas generator 68 decomposes the decomposable liquid 65 to reaction exhaust gases typically by a catalytic chemical reaction or thermal decomposition. For hydrazine, a suitable catalyst is alumina impregnated with iridium such as SHELL 405 (trademark of Shell Development Co., Emoryville, Calif.).

The exhaust gases are communicated through a third conduit 69 to the liquid propellant tank 30, displacing a volume of liquid propellant 12 which is delivered by means of a fourth conduit 67 to the combustion chamber 16 of rocket engine 18.

The reaction within the gas generator 68 is exothermic. To reduce the volume of pressurized gas 61 required to displace the liquid oxidizer 14, the pressurized gas is transmitted through a heat exchanger 70, in the form of a coil wrapped around the gas generator 68. The heat transferred from the gas generator to the coil heats and expands the pressurized gas 61.

The propellant expulsion system 60 is particularly adapted for larger space craft systems requiring two stages of operation. In the first stage, the first expulsion tank 22' is sized to have a volume blow down sufficient to expel the liquid propellant 12 from the primer tank 64. The volume of liquid propellant 12 in the primer tank 64 is sized such that the liquid propellant tank 30 remains partially filled following depressurization of the first expulsion tank 22'. The second expulsion tank 24 contains a volume of pressurized gas sufficient to empty the liquid oxidizer tank 42. Bi-propellant operation is used to power the space ship into orbit. The remaining liquid propellant 12 is then metered through valve 74 into the combustion chamber 76 of a steering engine 78. Since the liquid propellant thrust required to steer the orbiting space craft is less than that needed to achieve orbit, the second stage operation 12 is preferably as a mono-propellant system. The mono-propellant is decomposed to exhaust gases by reaction with catalyst 80.

FIG. 6 shows in block diagram the use of the ammonia vapor pressure as a control system to reduce the number of electromechanical controls required. The pressure generated by the compressed high vapor pressure liquid 44 is constant for a given ambient temperature. It is therefore possible to operate the propellant side as a near unity blow down reactor completely without controls. Valve 34 is a pyrotechnic, normally closed, valve which is explosively opened to initiate acceleration of the rocket engine 18. The reference pressure, the pressure of the first pressurized gas 26, as measured at conduit 69 is compared to the pressure of the second pressurized gas 61 at conduit 71. A sensor 82, such as a differential pressure switch, measures the pressure difference between the first 26 and second 61 pressurized gases. The sensor 82 communicates electrically with electronic controller 86 which in turn actuates electromechanical valve 88. The dynamic control of the electromechanical valve 88 ensures that the liquid propellant 12 to liquid oxidizer 14 mixture ratio is maintained at an optimum level.

FIG. 7 illustrates another embodiment of a propellant expulsion system 90. The propellant supply valve 92 and oxidizer supply valve 94 are independently controlled by controller 86. A differential pressure switch 96 compares the pressure at conduits 69 and 71 to a fixed reference gas pressure and electrically communicates with controller 86 which then adjusts the propellant supply valve 92 and oxidizer supply valve 94.

FIG. 8 shows in cross-sectional representation the differential pressure switch 96. The pressure switch 96 includes a rigid metallic housing 98 which is sufficiently thick to resist flexing when the differential pressure switch cavity 100 is pressurized to approximately 100–200 psia. The housing 98 is manufactured from a material which is essentially non-reactive with the gas used to fill the cavity 100. In preferred embodiments, the cavity 100 is filled with the vapor phase of a high vapor pressure liquid such as ammonia vapor and the housing is 0.1 inch stainless steel. A first aperture 102 and a second aperture 104 are formed in the housing 98 and sealed With a first 106 and second 108 diaphragm, respectively. The diaphragms 106, 108 are selected to be repetitively responsive to very small pressure differentials and are substantially non-reactive with the gas used to pressurized the cavity 100. The reference gas is in communication with the internal surface of the first 106 and second 108 diaphragms. Preferably, the first 106 and second 108 diaphragm are formed from a thin metallic sheet such as 0.005 inch thick stainless steel. First 110 and second 112 flanges hermetically join conduits 69 and 71 to the first 106 and second 108 diaphragms respectively. The first pressurized gas is in communication with the exterior surface of the first diaphragm 106 by means of the conduit 69. The second pressurized gas is in communication with the exterior surface of the second diaphragm 108 by means of the conduit 71.

A first microswitch 114 has a first mechanical sensor 116 which just contacts the first diaphragm 106 in the null position and is responsive to flexing of the diaphragm. When a pressure differential exists between the conduit 69 and the pressurized gas in cavity 100, the diaphragm 106 flexes. The flex is detected by the first mechanical sensor 116 and communicated to the first microswitch 114 which electrically communicates the change in pressure through wire 118 to the controller (not shown). The second microswitch 120 and second mechanical sensor 122 similarly communicate deflections in the second diaphragm 108 through wire 124 to the controller for control of the oxidizer side of the propellant expulsion system.

The cavity 100 contains a volume of the reference gas which is sufficient to fill the cavity with the gas at a specific temperature. If the temperature is then raised above the initial value, no high vapor pressure liquid is present to increase the vapor pressure corresponding to the new temperature. As a result, the pressure vs temperature profile will follow the gas laws. The pressure of the reference gas within cavity 100 will be proportional to the absolute temperature. Preferred gases to fill the cavity 100 are fluorinated hydrocarbons, ammonia and mixtures thereof. Ammonia is the most preferred. A temperature controller 126 heats or cools the reference gas to provide the desired reference pressure.

While FIG. 8 illustrates a differential pressure switch 96 useful to evaluate two separate pressurized gases, a sensor responsive to the pressure of a single gas may incorporate only a single diaphragm, conduit and micro switch.

FIG. 9 graphically illustrates the ratio of vapor pressure to temperature for ammonia at the equilibrium point when sealed in the cavity 100 of the differential pressure switch 96 at the temperatures indicated by reference points 128. When the differential pressure switch 96 is sealed at the temperature indicated by the "X" axis and the pressure indicated by the "Y" axis, the gas pressure will change in response to a subsequent temperature increase linearly as indicated by reference lines 130. The differential pressure switch 96 utilizing the gas pressure laws as illustrated by FIG. 9 provides a low dead band (less than 1 psi) between the internal reference pressure and the external pressure to be controlled.

FIG. 10 illustrates in block diagram another embodiment of a propellant expulsion system 132. As with the embodiment of FIG. 7, a differential pressure switch 134 independently senses the pressure differences in conduits 69 and 71 and electronically communicates the pressure values to a controller 86. The controller 86 then independently controls electromechanical propellant supply 92 and oxidizer supply 94 valves. Rather than the reference pressure being dictated by a reference gas sealed within the housing of the differential pressure switch 134, conduit 136 exploits the constant pressure of the vapor phase of a high vapor pressure liquid in the first expulsion tank 22. If the pressure at an initial temperature is known, then the reference pressure for a given temperature can be determined from the gas laws. Alternatively, the second pressurized gas 61 is utilized if the second expulsion system is selected to include the vapor phase of a high vapor phase liquid in the gas law condition.

FIG. 11 illustrates in cross-sectional representation the differential pressure switch 134 of FIG. 10. The differential pressure switch 134 is substantially the same as the switch 96 of FIG. 8, with the addition of a third aperture 138 which communicates the pressure of the first expulsion tank by means of conduit 136 to cavity 100. Third flange 140 ensures that the pressure within the cavity 100 is equal to the pressure communicated through conduit 136. Heaters and thermostats are not required since control of the reference pressure is maintained in the first expulsion tank.

While the invention has been described in terms of bi-propellant expulsion systems, it is equally applicable to mono-propellant expulsion systems.

The patents set forth in this application are incorporated by reference herein.

It is apparent that there has been provided in accordance with this invention a means to expel a liquid fuel from a storage tank to a rocket engine and to control the rate of that expulsion which fully satisfies the objects, features and advantages set forth hereinabove. While the invention has been described in combination with the embodiments thereof, it is evident that many alternatives, modifications and variations will be apparent to those skilled in the art in light of the foregoing description. Accordingly, it is intended to embrace all such alternative modifications and variations as fall within the spirit and broad scope of the appended claims.

I claim:

1. A system for delivering a liquid fuel component to a rocket engine, comprising:

an expulsion tank containing a pressurized first liquid at that liquid's equilibrium point pressure and a pressurized inert gas selected from the group consisting of helium, nitrogen and mixtures thereof;

a liquid fuel component tank containing a liquid fuel;

a first conduit for controllably delivering said pressurized inert gas to said liquid fuel component tank thereby displacing at least a portion of said liquid fuel component; and a second conduit for delivering said liquid fuel component to a combustion chamber of said rocket engine.

2. The system of claim 1 wherein said first liquid has an equilibrium vapor pressure at 70° F. of from about 100 psia to about 1500 psia.

3. The system of claim 2 wherein said first liquid has an equilibrium vapor pressure at 70° F. of from about 130 psia to about 500 psia.

4. The system of claim 3 wherein said first liquid is selected from the group consisting of ammonia, fluorinated hydrocarbons and mixtures thereof.

5. The system of claim 4 wherein said first liquid is ammonia, said pressurized inert gas is helium and said liquid fuel component is hydrazine.

6. The system of claim 4 wherein said first liquid is ammonia, said pressurized inert gas is helium and said liquid fuel component is nitrogen tetroxide.

7. A system for delivering a liquid fuel component to a rocket engine, comprising:

a tank having an expulsion portion containing a pressurized first liquid and a pressurized fluid, and a liquid fuel component portion containing a liquid fuel;

a piston disposed between said expulsion portion and said liquid fuel component portion driven by evaporation and expansion of said pressurized first liquid for displacing at least a portion of said liquid fuel component; and a conduit for delivering said liquid fuel component to a combustion chamber of said rocket engine.

8. The system of claim 7 wherein said piston is formed from stainless steel.

9. The system of claim 7 wherein said pressurized fluid is an inert gas.

10. The system of claim 9 wherein said pressurized fluid is selected from the group consisting of helium, nitrogen and mixtures thereof.

11. The system of claim 10 wherein said first liquid has a vapor pressure at 70° F. of from about 100 psia to about 1500 psia.

12. The system of claim 11 wherein said first liquid is selected from the group consisting of ammonia, fluorinated hydrocarbons and mixtures thereof.

13. The system of claim 12 wherein said first liquid is ammonia, said pressurized fluid is helium and said liquid fuel component is hydrazine.

14. The system of claim 12 wherein said first liquid is ammonia, said pressurized fluid is helium and said liquid fuel component is nitrogen tetroxide.

* * * * *